Nov. 2, 1948.    H. M. SHERIDAN    2,452,877
TOOL BIT AND HOLDER THEREFOR
Filed June 2, 1945
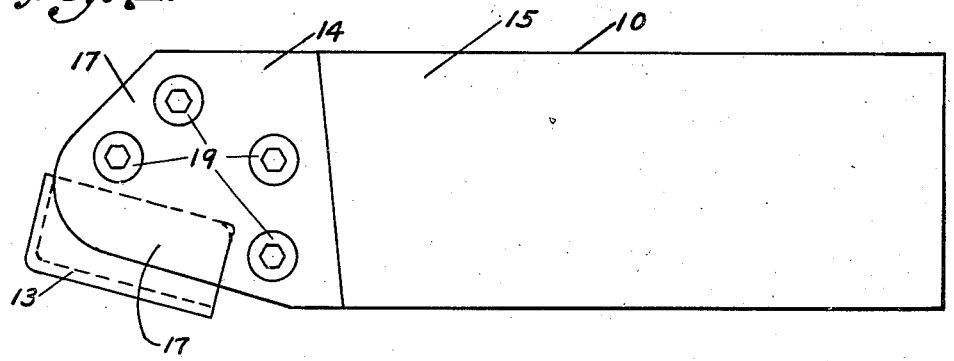
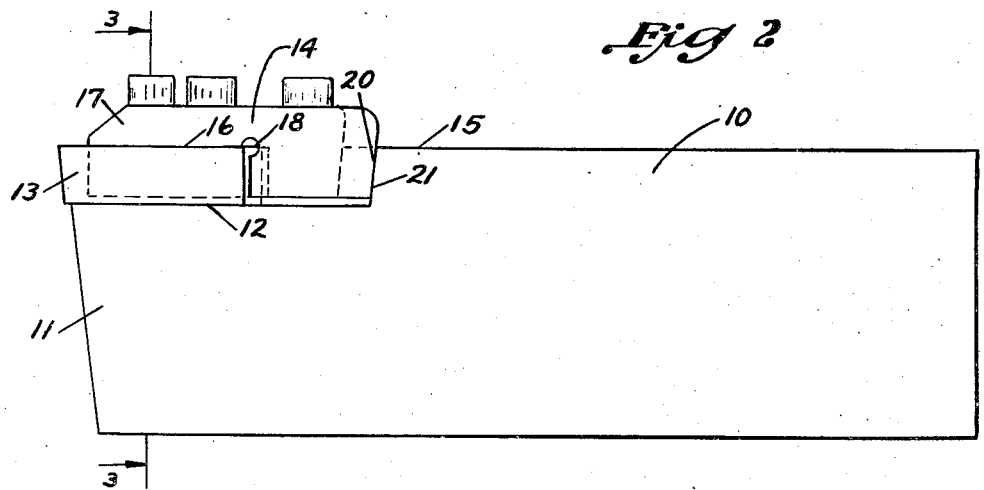
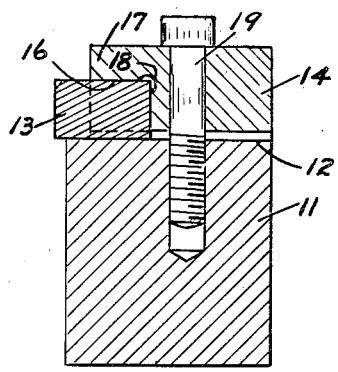
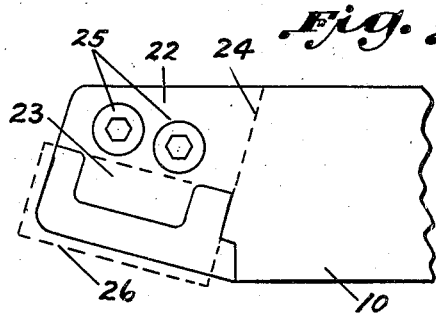
INVENTOR.
Henry M Sheridan
BY
R. T. Sperry
ATTORNEY.

Patented Nov. 2, 1948

2,452,877

UNITED STATES PATENT OFFICE 2,452,877

TOOL BIT AND HOLDER THEREFOR

Henry M. Sheridan, Erie, Pa., assignor to Apex Tool & Cutter Company, Shelton, Conn., a corporation of Connecticut Application June 2, 1945, Serial No. 597,274

1 Claim. (Cl. 29—96)

This invention relates to tool bits and holders therefor, and is particularly concerned with replaceable bits and their holders in which the cutting tool or bit is removably and adjustably secured within the holder at an angle to the axis thereon.

The prime object of the present invention is to provide means by which tool bits of relatively expensive cutting material are secured to a relatively inexpensive holder so as to avoid the expense of a solid onepiece tool. Such bits may be removed for grinding and may be discarded and replaced without the expense of replacing the entire tool.

It is also among the objects of the invention to provide a tool holder which is of simple rigid design and which may be readily manufactured at a minimum of expense and a minimum of intricate machining operations.

Another object of the invention is to provide a mounting for a tool bit by which the cutting strains are so dispersed as to minimize direct transverse or longitudinal thrusts.

A further object of the invention is to provide a new and improved cooperation between the bit holding member and the tool body so as to insure rigidity of the bit securement.

Other objects and features of the invention will be apparent from a consideration of the following specification taken in conjunction with the accompanying drawing, in which:

Fig. 1 is a top plan view of one of the preferred embodiments of the present invention;

Fig. 2 is a side elevation of that form of the invention shown in Fig. 1;

Fig. 3 is a section taken on the line 3—3 of Fig. 2, and

Fig. 4 is a top plan view of a modified form of the invention.

The inventive concept may be generally defined as a holder shank or body provided with a tool bit seat, the inner face of which is angularly disposed both vertically and transversely and a bit clamp adapted to receive a bit and dispose the same with its cutting edges at an angle to the axis of the shank, the arrangement being such that the cutting thrust is dissipated throughout the mass of the body.

In the drawing, the numeral 10 represents the elongated rectangular body or shank of the holder which terminates in a bit receiving head 11. The head 11 which is here shown as merely the extended left end of the body 10 is reduced in thickness to provide a bit seat 12 which receives thereon the bit 13. The bit 13 is preferably a simple rectangular piece of cutting material such as carbide steel and it is arranged on the seat 12 to extend at an angle to the side edges thereof, both longitudinally and transversely so as to provide cutting edges angularly disposed with respect thereto. The head 11 is suitably cut away to permit limited overhanging of the bit. Rigidly securing the bit 13 on the seat 12 and fixedly with respect to the head 11 a clamp 14 is provided, the upper surface of which is beyond the upper surface 15 of the head 11. The under surface of the clamp 14 is provided with an angularly disposed recess as indicated at 16, the recess including longitudinal and transverse walls which are conformed to the inner longitudinal and transverse walls of the bit 13 when arranged at an angle to the axis of the body. The recess provides a clamping flange 17 which is joined with the side walls by a radius 18, the arrangement being such that the bit will firmly seat within the recess whereby upon tightening of the clamp the bit will be securely retained without the possibility of vibration thereof with respect to the shank.

Securing screws 19 are provided for retaining the clamp against the upper surface of the bit, there being provided four such screws as shown.

The clamp 14 is provided with an inner wall 20 which extends across the head 11 and is inclined at a small angle preferably in the nature of 5° from the vertical and is likewise extended at a similar angle to the transverse of the head. The seat 12 terminates in a wall 21, the angularity of which is the same as the angularity of the wall 20 and cutting thrusts applied to the bit 13 both inwardly and transversely, will be relieved by the joint angularity between the walls 20 and 21, thus transferring or biasing the direct thrust to a vector component other than a pure transverse or longitudinal thrust. In this manner the securement of the bit within the body is protected from strains which would otherwise tend to loosen the bit and permit chattering thereof within the holder.

In that form of the invention shown in Fig. 4, the clamp is shown at 22 and is formed as an integral part of the body 10. An overhanging lip 23 is provided to bear against the top of the bit 26, the whole clamp being undercut to the extent of the line 24 so as to provide a limited flexing of the clamp under the influence of stress applied by the screws 25.

In carrying out the present invention it may be desirable to provide various types of serrations between the bit and seat or the bit and clamp. It may also be desirable to provide different types of securing means under different circumstances, as for instance, screws extending into the clamp through the lower part of the head 11.

It will, of course, be understood that such changes, modifications and the full use of equivalents may be resorted to without departure of the spirit or scope of the invention as outlined in the appended claim.

What I claim is:

A tool holder comprising a shank having an extended portion providing a flat seat with a terminal wall extending in a single plane from said seat, said plane being inclined rearwardly from the plane of the seat and also extending diagonally across said seat, a bit clamp mounted over said seat having a rear wall snugly embracing and conforming to said terminal wall and having an open sided bit receiving recess therein extending inwardly in the direction of said diagonal wall and forming in combination with said seat a bit pocket having a top, bottom, inner end and side wall, and means for forcing said clamp toward said seat, the inner end and side wall of the bit pocket being at right angles to each other, the end wall slanting inwardly at an angle to a perpendicular transverse plane through the shank axis and the side wall slanting longitudinally towards said axis.

HENRY M. SHERIDAN.

REFERENCES CITED

The following references are of record in the file of this patent:

UNITED STATES PATENTS

| Number | Name | Date |
|---|---|---|
| 1,319,443 | Wille | Oct. 21, 1919 |
| 1,456,552 | Henning | May 29, 1923 |
| 1,476,262 | Marshall | Dec. 4, 1923 |

FOREIGN PATENTS

| Number | Country | Date |
|---|---|---|
| 639,824 | France | Mar. 17, 1928 |
| 701,534 | France | Mar. 17, 1931 |